United States Patent [19]

Holzmann

[11] Patent Number: 5,088,800
[45] Date of Patent: Feb. 18, 1992

[54] VEHICLE BRAKE SYSTEM HAVING ANTI-SKID APPARATUS

[75] Inventor: Roland Holzmann, Oettingen, Fed. Rep. of Germany

[73] Assignee: Robert Bosch GmbH, Stuttgart, Fed. Rep. of Germany

[21] Appl. No.: 568,819

[22] Filed: Aug. 17, 1990

[30] Foreign Application Priority Data

Oct. 31, 1989 [DE] Fed. Rep. of Germany ....... 3936217

[51] Int. Cl.⁵ .............................................. B60T 8/32
[52] U.S. Cl. ............................. 303/113 AP; 303/9.62; 303/115 PP
[58] Field of Search ............. 303/113, 115, 116, 119, 303/9.62, 9.73, 113 AP, 113 R, 115 PP, 116 R

[56] References Cited

U.S. PATENT DOCUMENTS

| | | | |
|---|---|---|---|
| 4,703,979 | 11/1987 | Nakanishi et al. | 303/119 X |
| 4,714,296 | 12/1987 | Imoto et al. | 303/9.62 |
| 4,781,421 | 11/1988 | Nishimura et al. | 303/115 |
| 4,826,257 | 5/1989 | Burckhardt et al. | 303/111 |
| 4,840,434 | 6/1989 | Leiber | 303/9.75 |

FOREIGN PATENT DOCUMENTS

| | | | |
|---|---|---|---|
| 3301902 | 7/1984 | Fed. Rep. of Germany | 303/9.62 |
| 3844126 | 7/1989 | Fed. Rep. of Germany | 303/115 |
| 0181755 | 8/1966 | Japan | 303/113 |
| 0182151 | 7/1989 | Japan | 303/115 |
| 0249552 | 10/1989 | Japan | 303/115 |

*Primary Examiner*—Matthew C. Graham
*Attorney, Agent, or Firm*—Edwin E. Greigg; Ronald E. Greigg

[57] ABSTRACT

A vehicle brake system of the previously known type has a rear wheel brake booster, between a brake pressure source and an anti-skid apparatus associated with the rear wheels of the vehicle; the brake booster can be switched on by an electrically controllable switchover device. However, switching on of the rear wheel brake booster is effected at the onset of braking only if the anti-skid apparatus is in an operative functional condition. The complex structure of the switchover device in the form of a 3/2-way magnetic valve is a disadvantage. For simplification and economy, the switchover device is provided with an electrically controllable 2/2-way valve and a 2/2-way valve that is mechanically controllable by the stepped piston of the rear wheel brake booster and is built into this brake booster. An electrically controllable 2/2-way valve, which is a component of the anti-skid apparatus, is likewise triggered to activate the rear wheel brake booster.

3 Claims, 1 Drawing Sheet

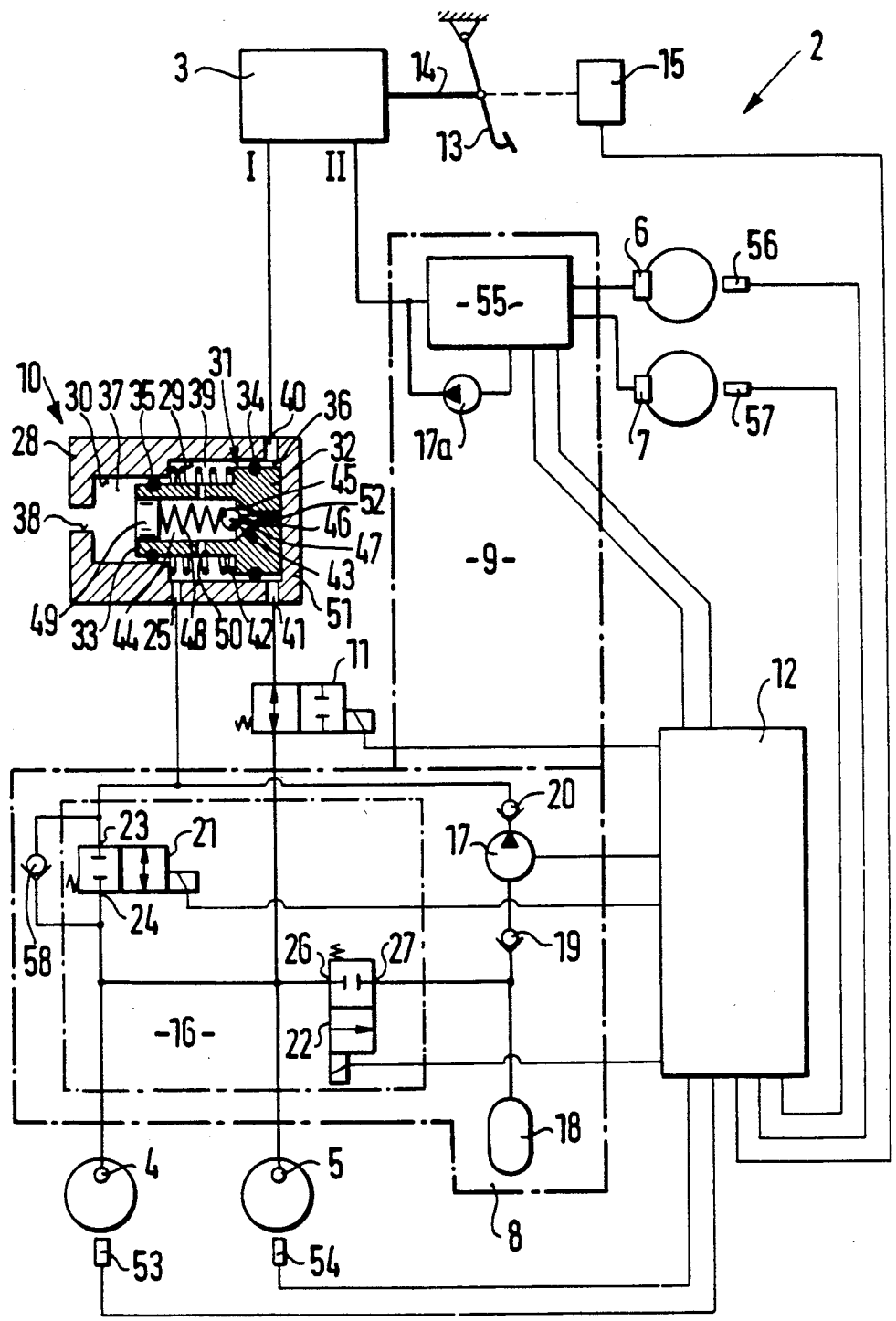

VEHICLE BRAKE SYSTEM HAVING ANTI-SKID APPARATUS

BACKGROUND OF THE INVENTION

The invention is based on a vehicle brake system as defined hereinafter. German Offenlegungsschrift 37 06 663 discloses a vehicle brake system of this generic type. An electrically controllable switchover device that is embodied as a so-called 3/2-way magnetic valve is associated with a rear wheel brake pressure booster of this vehicle brake system. A 3/2-way magnetic valve of this kind has the disadvantages of technical complexity and of the engineering expense for not only two valve seats but two closing elements as well, that are coupled to one another and must be actuated by a common armature of an electromagnet.

OBJECT AND SUMMARY OF THE INVENTION

The vehicle brake system according to the invention has the advantage that a more simply embodied magnetic valve can be used for the switchover device. The embodiment as defined hereinafter has the advantages of requiring little structural space and little expense for the disposition of connecting conduits. The exemplary embodiment as defined results in a simple structural form for this valve.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment of the vehicle brake system according to the invention.

DESCRIPTION OF THE PREFERRED EMBODIMENT

The vehicle brake system 2 has a brake pressure source 3; rear wheel brakes 4, 5; front wheel brakes 6, 7; an anti-skid apparatus 8 for the rear wheel brakes 4, 5; an anti-skid apparatus 9 for the front wheel brakes 6, 7; a rear wheel brake booster 10; a switchover device 11; and a control unit 12.

The brake pressure source 3 is for instance embodied as a dual-circuit tandem master brake circuit and is provided with brake circuit connections I and II. A brake booster of the prior art (not shown) may be associated with the tandem master brake cylinder 3. For actuating the tandem master brake cylinder 3, a brake pedal 13 is provided that acts upon the tandem master brake cylinder 3 via an element 14. Also associated with the brake pedal 13 is a switch 15 that reports an actuation of the brake pedal 13 to the control unit 12.

The anti-skid apparatus 8 for instance includes an anti-skid valve assembly 16, a return pump 17, and a low-pressure reservoir 18 in common for both rear wheel brakes 4 and 5. Connected to the anti-skid valve assembly 16 are the aforementioned rear wheel brakes 4 and 5, an inlet valve 19 of the return pump 17, and the low-pressure reservoir 18, and finally an outlet valve 20 of the return pump 17, as well as the rear axle brake booster 10 and its switchover valve assembly 11. The anti-skid valve assembly 16 comprises a first electrically controllable 2/2-way valve 21, which is normally closed, and a second electrically controllable 2/2-way valve 22, which is likewise normally closed. One inlet 23 of the 2/2-way valve 21 communicates with one outlet 25 of the rear wheel brake booster 10 and with the outlet 20 of the return pump 17. An outlet 24 of this 2/2-way valve 21 communicates with the wheel brakes 4 and 5, an inlet 26 of the 2/2-way valve 22 and also with the switchover device 11. One outlet 27 of the 2/2-way valve communicates as already indicated with the low-pressure reservoir 18 and the inlet valve 19 of the return pump 17.

The switchover device 11 is embodied as a 2/2-way valve, which is normally open, for connecting the rear wheel brakes 4 and 5 to the brake circuit connection I of the brake pressure source 3.

The rear wheel brake booster 10 has a stepped cylinder 28 including a first cylinder 29 and a second cylinder 30, and a stepped piston 31, which forms a first piston 32 in the vicinity of the first cylinder 29 and a second piston 33 in the vicinity of the second cylinder 30. The stepped piston 31 is sealed off relative to the first cylinder 29 and the second cylinder 30 by seals 34 and 35. The seal 34, the first piston 32 and the first cylinder 29 define a first chamber 36. The seal 35, the second piston 33 and the second cylinder 30 define a second chamber 37, which has a smaller diameter than the chamber 36 and communicates with the environment via a vent opening 38. Between two seals 34 and 35, the first cylinder 29 encloses a third chamber 39, which has an annular cross section. This annular cross section is defined by the different diameters of the first piston 32 and the second piston 33.

The first chamber 36 has an inlet 40, which communicates permanently with the brake pressure source 3 via the brake circuit connection I. In the present exemplary embodiment, the first chamber 36 is provided with a connection 41 that communicates with the inlet 40. Via the connection 41, with the aid of the first chamber 36 and its inlet 40, the switchover device 11 communicates permanently with the brake pressure source 3.

The outlet 25 proceeds from the third chamber 39. A stepped piston restoring spring 42 is built into the third chamber 39 in such a way that upon a displacement of the stepped piston as a consequence of the force of the stepped piston restoring spring, the first chamber 36 can have its smallest volume and the third chamber 39 can have its largest possible volume.

A 2/2-way valve 43 is built into the stepped piston 31. For this purpose, the stepped piston 31 has a valve chamber 44, which is adjoined toward the first chamber 36 by a valve seat 45 and finally an opening 46. The opening 46 discharges into the aforementioned first chamber 36. A closing element 47, for instance spherical in shape, is associated with the valve seat 45. A closing spring 48 built into the valve chamber 44 urges the closing element 47 toward the valve seat 45. Opposite the closing element 47, the closing spring 48 is retained by a closure plug 49. Via at least one conduit 50, the valve chamber 44 communicates with the third chamber 39 and the outlet 25. An opening element 52 is disposed between one end wall 51, which adjoining the first piston 32 defines the first chamber 36, and the closing element 47. The length of the opening element 52 is dimensioned such that whenever the first piston 32 rests on the end wall 51, the closing element 47 is lifted from its valve seat 45, and as a result creates a communication between the inlet 40 of the rear wheel brake booster 10 and its outlet 25.

The control unit 12 is connected to wheel rotation sensors 53 and 54 which are associated with the wheel brakes 4 and 5, for ascertaining the rotation behavior of rear wheels (not shown) that can be braked with these wheel brakes. The control unit 12 is also arranged to evaluate wheel rotation signals deriving from the wheel rotation sensors 53 and 54 and can accordingly detect the rotation behavior of the associated wheels and as a function thereof act upon the anti-skid valve assembly 16 and the return pump 17.

The brake circuit connection II is associated with the front wheel brakes 6 and 7 on the brake pressure source 3. The anti-skid apparatus 9, which may for instance have an anti-skid valve assembly 55, is located between the brake circuit connection II and the wheel brakes 6 and 7. In a manner not shown, this anti-skid valve assembly 55 may comprise two electrically controllable 2/2-way valves, or as disclosed in German Offenlegungsschrift 37 06 663 it may be embodied as a so-called 3/3-way magnetic valve. A return pump 17a of the same type as the return pump 17 is logically associated with the anti-skid valve assembly 55. The two return pumps 17, 17a may be combined in a manner known from German Offenlegungsschrift 37 06 663 and may be drivable by an eccentric element. To control the anti-skid valve assembly 55, which is not the subject of the present invention, wheel rotation sensors 56 and 57 may likewise be used, which carry wheel rotation signals to the control unit 12.

Function of the vehicle brake system:

It is assumed first that either the control unit 12 is not supplied with voltage, or that the control unit 12, by self-testing, known per se, has ascertained that either itself or the anti-skid valve assemblies 16 and 55 and the at least one return pump 17 are incapable of functioning. The control unit 12 then does not act upon the 2/2-way valve 21 and does not act upon the switchover device 11. Consequently the switchover device 11 remains in its basic position and allows pressure fluid through it that can be positively displaced from the brake pressure transistor 3 by actuation of the brake pedal 13 and can be carried into the wheel brakes 4 and 5. The 2/2-way valve 21 thus remains in its basic position and is closed. Accordingly, the brake pressure that the brake pressure source 3 supplies to the brake circuit connection I is operative in the wheel brakes 4 and 5. It is understood that no pressure boosting then takes place between the brake pressure source 3 and the wheel brakes 4 and 5. Consequently, brake forces that can be generated by the wheel brakes 4 and 5 are at a preselected first ratio to brake forces that can be generated by means of the same brake pressure inside the front wheel brakes 6 and 7. By suitable adaptation of the front brake forces to the rear ones, a vehicle equipped in this way is adequately controllable during forceful braking.

If the control unit 12 in its self-testing mode ascertains that all the electrically controllable components of the vehicle brake system are in functional condition, then it puts itself in readiness for anti-skid operation. Actuation of the brake pedal 13 also actuates the switch 15. The switch 15 indicates to the control unit 12 that the driver is initiating braking. The control unit 12 thereupon opens the 2/2-way valve 21, which as a result acts as a brake pressure buildup valve, and also closes the switchover device 11. The result is that a direct communication between the wheel brakes 4 and 5 and the brake pressure source 3 is ended, and that the rear wheel brake booster 10 is switched on instead between the brake pressure source 3 and the wheel brakes 4 and 5. Pressure given up by the brake pressure source 3 by actuation of the brake pedal 13 therefore initially effects a pressure increase in both chambers 36 and 39, which because of the absence of pressure in the second chamber 37 causes a displacement of the stepped piston 31 counter to the force of the stepped piston restoring spring 42. In this process the first piston 32 moves away from the end wall 51, and as a result an opening kept open by the opening element 52 between the valve seat 45 and its closing element 47 disappears. Finally, the closing element 47 is seated in a sealing manner on the valve seat 45 because of the force of the closing spring 48. Upon further motion of the stepped piston 31, the opening element 52, as long as it is firmly connected to the closing element 47, can likewise move away from the end wall 51. As a result, a second ratio exists between the front and rear brake forces, as a result of the rear wheel brake boosting. The level of the rear wheel brake boosting is selectable by selecting the diameters of the first piston 32 and second piston 33. As explained in German Offenlegungsschrift 37 06 663, this adaptation is selected for example such that as braking becomes more forceful, rear wheels tend to block first. Finally, anti-skid operation is tripped in the control unit 12 via the wheel rotation sensors 53 and 54.

To lessen the possible danger of skidding or wheel locking that may arise, the control unit 12 causes the 2/2-way valve 21 to return to its basic position, so that the wheel brakes 4 and 5 are separated from the rear wheel brake booster 10. This prevents an increase in brake pressure in the wheel brakes. If it is recognized as necessary by the control unit 12 that the wheel brake pressures in the wheel brakes 4 and 5 should be reduced, then it opens the 2/2-way valve 22, which is a pressure lowering valve, toward the low-pressure reservoir 18 and the inlet 19 of the return pump 17. At the same time, the return pump 17 is switched on, so that the low-pressure reservoir 18 can be evacuated. Pressure fluid pumped by the return pump 17 through its outlet 20 is then available at the inlet 23 of the 2/2-way valve 21 intended for raising the brake pressure The quantities of pressure fluid not required there flow into the rear wheel brake pressure booster 10. The stepped piston 31 deflects in this process and from its first chamber 36 it positively displaces pressure fluid in the direction of the brake pressure source 3.

If the control unit 12 recognizes that the danger of skidding has been overcome, then it closes the 2/2-way valve 22 acting as a brake pressure lowering valve and opens the 2/2-way valve 21 acting to raise pressure, so that the rear wheel brake booster 10, through the 2/2-way valve 21, can increase brake pressures in the wheel brakes 4 and 5.

A wheel brake relief valve 58 embodied as a one-way valve has not been mentioned yet; it is suitable for arbitrary relief of the wheel brakes 4 and 5 by release of the brake pedal 13, whenever for some reason the 2/2-way valve 21 and the switchover device 11 are closed. The wheel brake relief valve 58 thus forms a bypass, which is provided for safety reasons but acts in only one direction, around the 2/2-way valve 21 and the switchover device 11.

In the exemplary embodiment shown, both rear wheel brakes 4 and 5 are associated with a single brake circuit, which begins at I. The brake pressures of both wheel brakes 4 and 5 are always equally high. However, each of the wheel brakes 4 and 5 may instead be assigned its own anti-skid valve assembly 16. Although that makes the cost to the purchaser of the vehicle having the vehicle brake system higher, depending on the vehicle type it can lead to shorter braking distances and better controllability of the vehicle.

Instead of the association of two rear wheel brakes 4 and 5 with one brake circuit beginning at I, an association of the rear wheel brakes 4 and 5 to two brake circuits can also be performed by one skilled in the art. In this case, a separate rear wheel brake booster 10 and its own switchover device 11 are selected for each brake circuit. Naturally, it is also possible, however, to integrate both rear wheel brake boosters and both switchover devices.

A comparison with the vehicle brake system of German Offenlegungsschrift 37 06 663 shows that by means of a novel embodiment of the anti-skid valve assembly 16 and by disposing a hydraulically-mechanically controlled valve 43 in the manner of the present invention, a more simply embodied switchover device 11 can be used.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A vehicle brake system comprising a brake pressure source, front and rear wheel brakes; at least one anti-skid apparatus disposed between the brake pressure source and the wheel brakes, said at least one anti-skid apparatus has at least one electrically controllable anti-skid valve assembly for lowering and raising brake pressures in the wheel brakes, at least one return pump that communicates with the anti-skid valve assembly; at least one rear wheel brake booster, which is supplied with a brake fluid from the brake pressure source; a stepped cylinder, a stepped piston, a stepped piston restoring spring and a first chamber of cylindrical cross section defined by the stepped piston, a second chamber of smaller cylindrical cross section compared with the first chamber, a third chamber of annular cross section located between the first and second chamber, an inlet which is supplied from the brake pressure source, and an outlet which communicates with the anti-skid valve assembly; an electrically controllable switchover device; an electronic control unit, said electric control unit arranged to control the anti-skid valve assembly and the return pump as a function of the rotational behavior of at least one associated wheel, said control unit further causes the rear wheel brake booster to come into action upon initiation of braking whenever the at least one anti-skid apparatus is in an operative functional condition, in which a) the anti-skid valve assembly (16) connected with the rear wheel brake booster (10) has a brake pressure raising valve (21), which is connected to the outlet (25) of the rear wheel brake booster (10) and is closed when in its basic position, and a brake pressure lowering valve (22) connected to the rear wheel brake;

b) the outlet (25) of the rear wheel brake booster (10) communicates with the third chamber (39);

c) the inlet (40) of the rear wheel brake booster (10) communicates permanently with the brake pressure source (3);

d) the switchover device (11) has an electrically controllable 2/2-way valve, which is open in the basic position and is disposed between the brake pressure source (3) and the at least one rear wheel brake (4, 5);

e) a 2/2-way valve (43) is disposed between the inlet (40) and the outlet (25) of the rear wheel brake booster (10) and is controllable by the stepped piston (31), which valve is open in the basic position of the stepped piston (31) and is closable by displacement of the stepped piston (31); and f) the control unit (12) is controlled such that upon initiation of braking, in an anti-skid control mode, the control unit (2) opens the brake pressure raising valve (21) and closes the 2/2-way valve of the switchover device (11).

2. A vehicle brake system as defined by claim 1, in which the 2/2-way valve (43) controllable by the stepped piston (31) is built into the stepped piston (31).

3. A vehicle brake system as defined by claim 2, in which the 2/2-way valve (43) is embodied as a seat valve equipped with a closing spring (47), and that disposed between a closing element (47) and an end wall (51) on the inlet side of the stepped cylinder (28) is an opening element (52), which extends through an opening (46) that leads to a valve seat (45).

* * * * *